Dec. 21, 1954   J. W. PARKS   2,697,494
WHEEL CHOCK UNIT
Filed Feb. 19, 1952
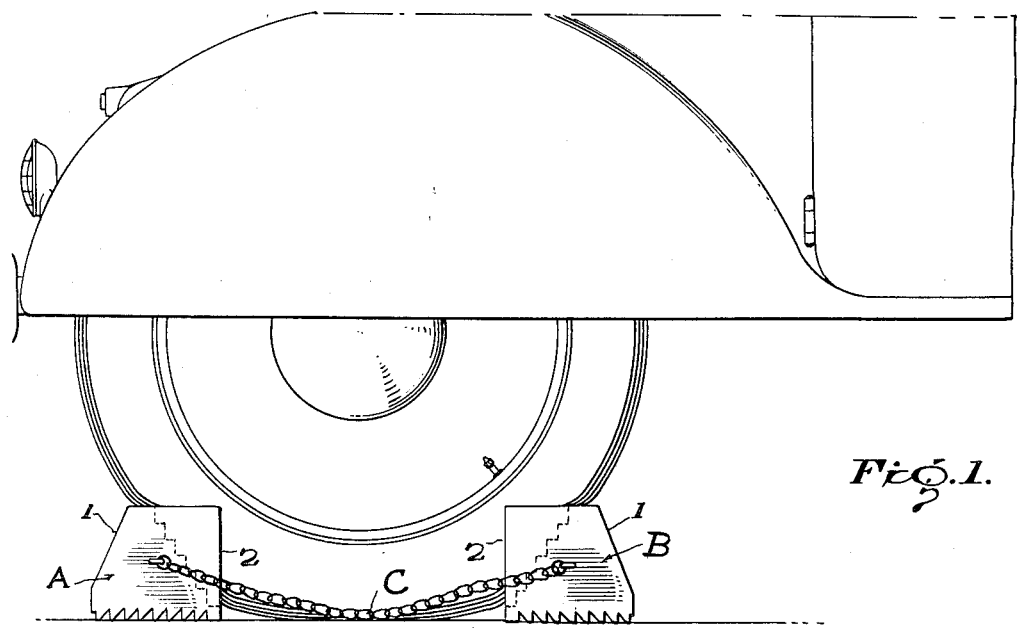
Fig.1.
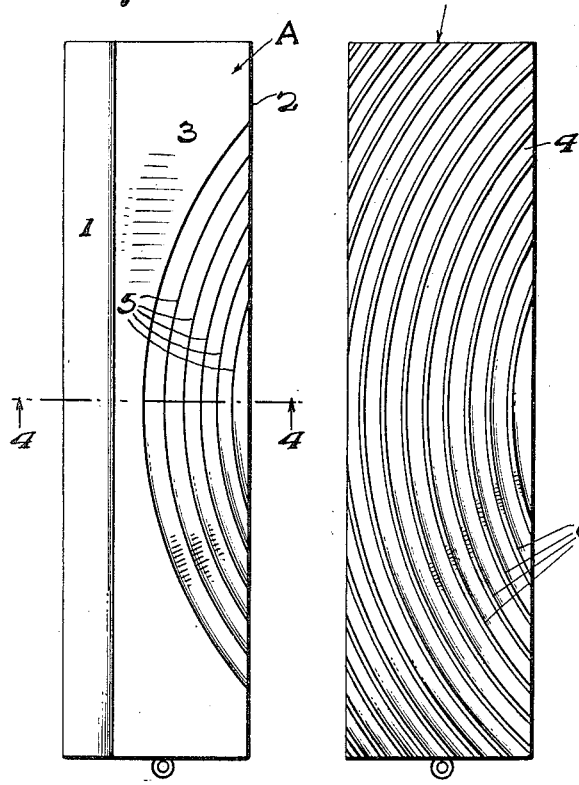
Fig.2.
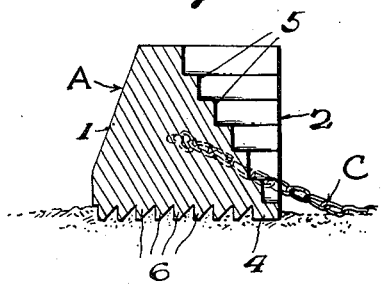
Fig.4.
Fig.3.
INVENTOR.
Joseph W. Parks.
BY
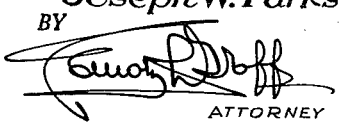
ATTORNEY

United States Patent Office 2,697,494
Patented Dec. 21, 1954

2,697,494
WHEEL CHOCK UNIT

Joseph W. Parks, Sebring, Fla.

Application February 19, 1952, Serial No. 272,431

1 Claim. (Cl. 188—32)

This invention relates to a wheel chock unit for use in blocking the wheel of an automobile, for example, when changing a tire.

As is well known, with the use of a bumper jack, the changing of a tire elevated by such jack can be a hazardous operation unless one or more wheels are prevented from rolling because, with a bumper jack, the car has to be lifted higher than with axle engaging type brakes which means that there is more likelihood of the opposite wheel slipping sidewise. This is especially true if the tire changing operation must be effected on a hill or on a road with considerable crown.

Accordingly, the present invention has for its object a sturdy and reliable chock unit comprising a pair of connected blocks having special tire and road gripping surfaces which resist any tendency of the tire and its wheel to roll forward, backward or sidewise.

Another object is to form the blocks of wood or moldable material wherein the tire engaging faces are formed with arcuate steps to provide an effective socket for receiving the tire, and likewise the bottom of the blocks are formed with serrations or grooves also formed as arcs of progressively different radii to provide ground engaging teeth that prevent relative movement between the blocks and the road.

A preferred and practical embodiment of the invention is shown in the accompanying drawing, in which:

Figure 1 is a view illustrating the application of the invention.

Figure 2 is a top plan view of one of the blocks.

Figure 3 is a bottom plan view of the block shown in Figure 2.

Figure 4 is a cross-section taken on the line 4—4 of Figure 2.

Similar references designate corresponding parts in the several views:

The complete unit consists of the duplicate chock blocks A and B connected by a chain C or the like. These blocks are used or applied as shown in Figure 1.

A description of one block will suffice for the other. Accordingly, referring to block A for example, it will be seen from Figure 2 that the same comprises a body of elongated rectangular form having the outer inclined face 1 and vertical inner face 2, said faces being connected by a top wall 3 and a bottom wall 4.

The vertical inner face 2 and top wall 3 are provided with a series of inwardly extending arcuate shoulders or steps 5 which in effect form teeth for engaging a tire tread over a large part of its circumference, particularly because the arcuate disposition of the teeth forms a socket for receiving the tread up to the point of the tire side walls.

The bottom wall 4 is provided with a plurality of equidistantly spaced ribs 6 of arcuate formation and all in the same horizontal plane. The ribs 6 are curved in a direction opposite to the curvature of the steps or teeth 5 as will be seen by comparing Figures 2 and 3. Thus, any tendency of the road engaging faces of the blocks to creep longitudinally or sidewise is effectively prevented, particularly since the ribs extend outward to all edges of block.

From the foregoing, it will be seen that each block is provided with dual gripping surfaces, namely, the teeth 5 and the ribs 6. While the road engaging ribs 6 are blunt as compared with the teeth 5, nevertheless they cover a greater area and, therefore, effectively grip the road surface.

The entire unit may be readily put in use and conveniently stored when desired.

It will, of course, be understood that changes may be resorted to within the scope of the appended claim.

I claim:

A wheel and tire chock, comprising, in combination, a body having an upper tire engaging face conforming generally to the profile of a tire tread, said face including a series of upwardly stepped, arcuate, right angular tire gripping shoulders forming horizontally disposed teeth with intervening cavities, said teeth and cavities cooperating to embeddingly interlock with the surface of the tire tread, and an anti-slipping bottom face having a series of horizontally disposed, concentric, arcuate road engaging ribs throughout its entire area from side to side and end to end, said ribs being formed from a common axis lying without the limits of the long side of the block which is remote from the tire to provide maximum biting road engaging resistance in lateral and frontal directions under weight and pressure imposed by the vehicle held by the chock.

References Cited in the file of this patent

UNITED STATES PATENTS

| Number | Name | Date |
|---|---|---|
| 340,880 | Johnson | Apr. 27, 1886 |
| 1,610,112 | Wendle et al. | Dec. 7, 1926 |
| 2,237,214 | Burkart | Apr. 1, 1941 |
| 2,521,539 | Richardson | Sept. 5, 1950 |
| 2,581,619 | Arrigo | Jan. 8, 1952 |

FOREIGN PATENTS

| Number | Country | Date |
|---|---|---|
| 286,002 | Great Britain | Feb. 27, 1928 |